US011985186B1

(12) United States Patent
Zhu et al.

(10) Patent No.: US 11,985,186 B1
(45) Date of Patent: May 14, 2024

(54) METHOD OF DRONE-ASSISTED CACHING IN IN-VEHICLE NETWORK BASED ON GEOGRAPHIC LOCATION

(71) Applicant: NANJING UNIVERSITY OF POSTS AND TELECOMMUNICATIONS, Nanjing (CN)

(72) Inventors: Qi Zhu, Nanjing (CN); Ting Gong, Nanjing (CN)

( * ) Notice: Subject to any disclaimer, the term of this patent is extended or adjusted under 35 U.S.C. 154(b) by 0 days.

(21) Appl. No.: 18/516,057

(22) Filed: Nov. 21, 2023

Related U.S. Application Data

(63) Continuation of application No. PCT/CN2023/117326, filed on Sep. 6, 2023.

(30) Foreign Application Priority Data

Feb. 10, 2023 (CN) .......................... 202310100594.2

(51) Int. Cl.
*H04L 67/1021* (2022.01)
*H04L 67/12* (2022.01)
*H04L 67/568* (2022.01)

(52) U.S. Cl.
CPC .......... *H04L 67/1021* (2013.01); *H04L 67/12* (2013.01); *H04L 67/568* (2022.05)

(58) Field of Classification Search
None
See application file for complete search history.

(56) References Cited

U.S. PATENT DOCUMENTS

| 9,773,422 | B2* | 9/2017 | Wouhaybi | G08G 5/006 |
| 9,852,599 | B1* | 12/2017 | Slavin | A61B 7/04 |
| 10,147,306 | B2* | 12/2018 | Kinney | G08B 19/00 |
| 10,230,450 | B2* | 3/2019 | Kim | H04L 67/12 |
| 10,645,169 | B2* | 5/2020 | Evans | G08G 5/0069 |
| 10,942,026 | B2* | 3/2021 | Barton | H04N 1/00204 |
| 11,025,375 | B2* | 6/2021 | Fox | H04L 67/12 |
| 11,253,736 | B2* | 2/2022 | Raucher | G05D 1/0038 |
| 11,320,837 | B2* | 5/2022 | Sukhomlinov | G05D 1/0276 |
| 11,579,633 | B1* | 2/2023 | Haslam | G05D 1/12 |
| 11,610,491 | B2* | 3/2023 | Hong | H04W 36/30 |

(Continued)

FOREIGN PATENT DOCUMENTS

| CN | 111682895 A | 9/2020 |
| CN | 113015105 A | 6/2021 |

(Continued)

OTHER PUBLICATIONS

Internation Search Report of PCT/CN2023/117326, dated Oct. 24, 2023.

*Primary Examiner* — Backhean Tiv

(57) ABSTRACT

The present application addresses the problem of high communication loads in the in-vehicle networks in cities and prolonged time spent by the vehicle in requesting services, and provides a method of drone-assisted caching in an in-vehicle network based on geographic location, the content is divided into local content and comment content; the moving vehicle and the drone only cache the comment content, the roadside unit fixed caches the local content and the comment content according to a ratio. The content delivery method is designed, and a content request latency of the in-vehicle is analyzed, and an optimization problem for minimizing the average request latency is constructed.

10 Claims, 2 Drawing Sheets

(56) References Cited

U.S. PATENT DOCUMENTS 11,792,129 B2 * 10/2023 Li .......................... H04L 67/12
370/310
2022/0399936 A1 * 12/2022 Arksey .................... G06T 7/73

FOREIGN PATENT DOCUMENTS

| CN | 113163377 A | 7/2021 |
| CN | 115174481 A | 10/2022 |
| WO | 2021253835 A1 | 12/2021 |

* cited by examiner

METHOD OF DRONE-ASSISTED CACHING IN IN-VEHICLE NETWORK BASED ON GEOGRAPHIC LOCATION

CROSS-REFERENCE TO RELATED APPLICATIONS

This application claims priority to Chinese Patent Application No. 202310100594.2, filed on Feb. 10, 2023, the entire disclosures of which are incorporated herein by reference.

TECHNICAL FIELD

The present application relates to the technical field of caching in in-vehicle networks, and specifically relates to a method of drone-assisted caching in an in-vehicle network based on geographic location.

BACKGROUND

With the development of science and technology, people's demand for vehicular transportation is growing, and applications such as intelligent transportation, driverless, road safety and in-vehicle entertainment are gradually gaining attention. Vehicles need to communicate with each other to exchange information to get a better driving experience, such as road safety information, entertainment information, so the Vehicular Ad-hoc Network (VANET) appeared in people's lives, however, the vehicles in the vehicle network have the characteristics of high-speed movement, which makes the network topology change quickly and quick unstable of the communication of the vehicle. Therefore, in order to improve the quality of service of in-vehicle network and reduce the communication load of the network, caching technology is introduced into VANET. The caching technology in in-vehicle networking is to cache the content at various nodes such as roadside units (RSUs) and vehicles at the edge of the network, so that the vehicles can obtain the demanded content directly from the surrounding nodes, which can effectively shorten the communication distance for the requesting vehicles to obtain the content, and reduce the traffic load on the content servers and the network.

SUMMARY

Objective of the present application: to propose a method of drone-assisted caching in an in-vehicle network based on geographic location, which solves the problem of high communication load in in-vehicle networks in cities and the prolonged time taken by vehicles to request service, introduces a drone with caching function in the in-vehicle network, designs a suitable caching method under the condition of considering the influence of geographic location on user's requests, and improves the performance of the system through joint optimization of caching strategies of each node and the flight trajectory of the drone; thus, it reduces the average request time latency and improves the success rate of caching.

In order to achieve the above purpose, the present application adopts the following technical solutions.

In a first aspect, the present application provides a method of drone-assisted caching in an in-vehicle network based on geographic location, wherein a drone is introduced into the in-vehicle network, and caching decisions of a roadside unit, the drone, and a vehicle are jointly taken into account in consideration of the effect of a geographic location on a request of the vehicle, to reduce an average request latency, to increase a caching ratio, the method including: executing following steps according to a preset cycle:

S1, dividing content into local content and comment content;

S2, constructing a collaborative caching mechanism based on the local content and comment content;

S3, constructing a delivery decision for the vehicle to obtain the content in different situations;

S4, analyzing a latency required for the vehicle to obtain the content based on the delivery decision and the collaborative caching mechanism, constructing an optimization problem P for minimizing the average request latency of the vehicle in the in-vehicle network during a time period T;

S5, based on the optimization problem P, building a preference list of the content of the drone and the roadside unit without considering interaction effect, and performing an initial caching based on the preference list of the content, and determining a caching ratio of the roadside unit caching the local content and the comment content by using an exhaustive caching method;

S6, deciding a caching decision for each roadside unit and each drone by using a preference-based switched collaborative caching method based on the optimization problem P and the determined caching ratio of the roadside unit; and S7, optimizing a flight trajectory of the drone by using a greedy algorithm based trajectory optimization method based on the optimization problem P, the caching ratio of the roadside unit and the caching decisions of the roadside unit and the drone.

In some embodiments, in the S2, constructing the collaborative caching mechanism based on the local content and the common content, includes:

S21, assuming that there are M numbers of road sections, deploying the roadside unit next to each road section, and deploying the drone with a caching function over the road section for assisting the roadside unit in providing services to the vehicle; dividing the time period T into a plurality of time slots, and the drone in each time slot has a corresponding traveling direction and speed;

a moving vehicle and the drone cache only the comment content, and the roadside unit fixed caches the local content and the comment content according to a certain ratio, and in response to that a caching capacity of the roadside unit $R_m$ is $CR_m$, a capacity $x_m \cdot CR_m$ is used to cache the local content, and a remaining capacity $(1-x_m) \cdot CR_m$ is used to cache the comment content, wherein $x_m$ denotes a ratio of the roadside unit $R_m$ caching the local content; and S22, $Y_m^R = \{y_{m,1}^R, \ldots y_{m,i}^R, \ldots, y_{m,I_m}^R\}$ is set of caching decision indicator variables of the roadside unit $R_m$, wherein $y_{m,i}^R$ is a caching indicator variable of the roadside unit $R_m$ for the content $f_i$, in response to that the roadside unit $R_m$ caches the content $f_i$, then $y_{m,i}^R = 1$, otherwise $y_{m,i}^R = 0$; and similarly $Y^U = \{y_1^U, \ldots y_b^U, \ldots, y_B^U\}$ is a set of caching decision indicator variables of the drone.

In some embodiments, in the S3, constructing the delivery decision for the vehicle to obtain the content in different situations, includes:

S31, obtaining, by the vehicle, the content through five methods denoted as $\{1, \ldots, e, \ldots, E\}$, $E=5$, wherein a content delivery decision indicator variable is $\alpha_{n,i,e}^t$, $\alpha_{n,i,e}{}^{t}=1$ indicates that the vehicle $v_n$ obtains the content $f_i$ through the method e in the time slot t, otherwise $\alpha_{n,i,e}{}^{t}=0$, each vehicle only obtains the content through one way denoted as $$\sum_{e=1}^{E} \alpha_{n,i,e}^{t} = 1;$$

S32, firstly searching for, by a requesting vehicle, requested content within one hop in a same direction lane, and in response to that the requested content is searched, a vehicle where the requested content is from directly transmits the requested content to the requesting vehicle;

S33, in response to that there is no the requested content for the vehicle within one hop in the same direction lane, querying information in a reverse lane; calculating time in which two vehicles are able to communicate based on speeds of the two vehicles and a distance between the two vehicles, and in response to that the time for communication is greater than the time required for the content to be transmitted and the vehicle in the reverse lane caches the requested content, the requesting vehicle obtains the requested content from the vehicle in the reverse lane;

S34, in response to that neither the vehicle in the same direction nor the vehicle in the reverse direction within the communication range have cached the requested content and the requesting vehicle is within a coverage area of the roadside unit, querying the information from the roadside unit, and in response to that the roadside unit has cached the requested content, it will transmit directly to the requesting vehicle;

S35, in response to that the requesting vehicle is not within the coverage area of the roadside unit or the roadside unit does not cache the requested content but the requesting vehicle is within a coverage area of the drone, querying information from the drone and in response to that the requested content is found, the drone will transmit the requested content to the requesting vehicle;

S36, in response to that the requested content is not found in the drone, but the drone is within the communication range of the roadside unit and the roadside unit has cached the requested content, the drone as a relay forwarding the requested content from the roadside unit to the requesting vehicle;

S37, in response to that the content is not available by any of the above methods and waiting time $D^W$ does not exceed maximum waiting time $D_{max}{}^{W}$ allowed, the vehicle will continue to wait and S32 to S36 is recycled in a next time slot until a feasible delivery method is found, in response to that a suitable decision is not found within the maximum waiting time or a communication link is disconnected during transmission of the content, the request for the content is considered to be failed.

In some embodiments, in the S4, the analyzing the latency required for the vehicle to obtain the content includes:

S41, in response to that the vehicle $v_n$ obtains the content $f_i$ through another vehicle $v_{n'}$ from moment $t_0$, then $\alpha_{n,i,1}{}^{t_0}=1$ or $\alpha_{n,i,2}{}^{t_0}=1$; a rate $R_{n',n}{}^{VV}(t)$ of the transmission of the content between the vehicle $v_n$ and the vehicle $v_{n'}$ in the time slot t, known from Shannon's formula, is denoted as:

$$R_{n',n}^{VV}(t) = B\log_2\left(1 + \frac{P_{n'} G_{n',n}(t)}{\sigma^2}\right);$$

where B denotes a bandwidth, $P_{n'}$ is a transmit power of the vehicle $v_{n'}$ where the content is from, $\sigma^2$ is a Gaussian white noise variance at a receiver and $G_{n',n}(t)$ is a channel gain between the vehicle $v_n$ and the vehicle $v_{n'}$ in the time slot t, $G_{n',n}(t)=\chi \cdot d_{n',n}(t)^{-\delta}$, $\delta$ is a path loss index, $\chi$ is a channel fading gain, and $d_{n',n}(t)$ is a distance between the vehicle $v_n$ and the vehicle $v_{n'}$;

assuming that a length of each time slot is D, a current time slot $t_l$ is a lth time slot after the moment $t_0$, an amount of data denoted as $s_c(t_l)=D \cdot R_{n',n}{}^{VV}(t_l)$ is transmitted in the current time slot $t_l$; assuming that all the contents are of equal size donated s, a size of an amount of data that has not been transmitted in the current time slot $t_l$ is $$s_r(t_l) = s - \sum_{j=1}^{l-1} D \cdot R_{n',n}^{VV}(t_j),$$

in response to that $s_r(t_l) > s_c(t_l)$, it means that the content delivery is unable to be completed in the current time slot and will be transmitted in a next time slot; in response to that $s_r(t_l) \leq s_c(t_l)$, it represents that the content delivery is able to be completed in the current time slot, and time used for transmitting data in the current time slot $$t_l \text{ is } \frac{s_r(t_l)}{R_{n',n}^{VV}(t)},$$

a transmission of the content ends in the current time slot $t_l$; $t_{L+1}$ denotes a time slot in which the content delivery is completed, which means the vehicle fully obtains its requested content in L+1th time slot after the comment $t_0$, a transmission delay $D_{n,i,e}{}^{t_0}$ for the vehicle $v_n$ to obtain the content $f_i$ from the other vehicle $v_{n'}$ is denoted as:

$$D_{n,i,e}^{t_0} = \sum_{l=1}^{L} D + \frac{s - \sum_{j=1}^{L} D \cdot R_{n',n}^{VV}(t_j)}{R_{n',n}^{VV}(t_{L+1})}, e \in (1, 2);$$

S42, in response to that the vehicle $v_n$ obtains the content $f_i$ directly through the roadside unit $R_m$ from the moment $t_0$; then $\alpha_{n,i,3}{}^{t_0}=1$, a rate at which the roadside unit $R_m$ transmits the content to the vehicle $v_n$ within the time slot t, shown from Shannon's formula, is denoted as:

$$R_{m,n}^{RV}(t) = B\log_2\left(1 + \frac{P_m G_{m,n}(t)}{\sigma^2}\right);$$

where B denotes the bandwidth, $P_m$ is a transmit power of the roadside unit $R_m$, $G_{m,n}(t)$ is a channel gain between the roadside unit $R_m$ and the vehicle $v_n$ at the time slot t, $G_{m,n}(t)=\chi \cdot d_{m,n}(t)^{-\delta}$, $d_{m,n}(t)$ is a distance between the roadside unit $R_m$ and the vehicle $v_n$; $t_{L+1}$ denotes a time slot for completing the content delivery, which means the vehicle fully obtains its requested content within the L+1 time slot after $t_0$, a transmission delay $D_{n,i,3}^{t_0}$ of the vehicle $v_n$ obtaining the content $f_i$ from the roadside unit $R_m$ is denoted as:

$$D_{n,i,3}^{t_0} = \sum_{l=1}^{L} D + \frac{s - \sum_{j=1}^{L} D \cdot R_{m,n}^{RV}(t_j)}{R_{m,n}^{RV}(t_{L+1})};$$

S43, in response to that the vehicle $v_n$ obtains the content $f_i$ through the drone from the moment $t_0$; then $\alpha_{n,i,4}^{t_0}=1$, for the communication between the drone and the vehicle, using probabilistic air-to-ground based communication model, which comprises a line-of-sight channel and a non-line-of-sight channel;

a transmission probability $P_{LoS}$ of the line-of-sight channel:

$$P_{LoS} = \frac{1}{1 + \beta_1 \exp[-\beta_2(\theta - \beta_1)]};$$

a transmission probability of the non-line-of-sight channel is $P_{NLoS}=1-P_{LoS}$, where $\theta$ represents an elevation angle from the drone to the vehicle, $\beta_1$ and $\beta_2$ are constant parameters subject to environment;

a path loss between the drone and its associated vehicle for the transmission of the line-of-sight channel is $L_{Los}$, and a path loss between the drone and its associated vehicle for the transmission of the non-line-of-sight channel is $L_{NLos}$:

$$\begin{cases} L_{Los} = \eta_{LoS}\left(\frac{4\pi f_c}{c}\right)^2 d_{u,n}^{t2} \\ L_{NLos} = \eta_{NLos}\left(\frac{4\pi f_c}{c}\right)^2 d_{u,n}^{t2} \end{cases};$$

where $\eta_{LoS}$ and $\eta_{NLos}$ are attenuation factors corresponding to the line-of-sight channel and the non-line-of-sight channel, respectively, $f_c$ is a carrier frequency, c denotes a speed of light, and $d_{u,n}^t$ denotes a distance between the drone and the vehicle $v_n$;

an average path loss $\overline{L}$ of a channel from the drone to the vehicle is:

$$\overline{L}=P_{Los}L_{Los}+P_{NLos}L_{NLos};$$

a transmission rate $R_{u,n}^{UV}(t)$ of the content from the drone to the vehicle $v_n$ in the time slot t is:

$$R_{u,n}^{UV}(t) = B\log_2\left(1 + \frac{P_U}{\overline{L}(d_{u,n}^t)\sigma^2 B}\right);$$

where B denotes the bandwidth, $P_U$ denotes a transmission power of the drone, $d_{u,n}^t$ denotes a distance between the drone and the vehicle $v_n$; $\sigma^2$ is the Gaussian white noise variance at the receiver; and a transmission delay of the vehicle $v_n$ to obtain the content $f_i$ from the drone is $D_{n,i,4}^{t_0}$:

$$D_{n,i,4}^{t_0} = \sum_{l=1}^{L} D + \frac{s - \sum_{j=1}^{L} D \cdot R_{u,n}^{UV}(t_j)}{R_{u,n}^{UV}(t_{L+1})};$$

S44, in response to that the vehicle $v_n$ obtains the content $f_i$ from the roadside unit $R_m$ relayed by the drone from the moment $t_0$, $\alpha_{n,i,5}^{t_0}=1$, then the transmission delay $D_{n,i,5}^{t_0}$ is equal to a delay of the roadside unit $R_m$ transmitting the content to the drone plus a delay $D_{n,i,5}^{t_0}$ of the drone forwarding the content to the vehicle $v_n$, which is denoted as:

$$D_{n,i,5}^{t_0} = \sum_{l=1}^{L} D + \frac{s - \left(D - \frac{s - \sum_{j'=1}^{L} D \cdot R_{m,u}^{RU}(t_{j'})}{R_{m,u}^{RU}(t_{L'+1})}\right) \cdot R_{u,n}^{UV}(t_{l'+1}) - \sum_{j=l'+2}^{L} D \cdot R_{u,n}^{UV}(t_j)}{R_{u,n}^{UV}(t_{L+1})};$$

where L' denotes that the drone completely obtains the requested content in a L'+1th time slot after the comment $t_0$, and $R_{m,u}^{RU}$ denotes a communication rate between the roadside unit $R_m$ and the drone.

In some embodiments, in the S4, the optimization problem P of minimizing the average request latency of the vehicle in the in-vehicle network during the time period T is denoted as:

$$P: \min_{X,Y^R,Y^U,G} D_{ave} = \frac{\sum_{t=1}^{T}\sum_{n=1}^{N}\sum_{i=1}^{I}\sum_{e=1}^{E} re_{n,i}^t \alpha_{n,i,e}^t (D_{n,i,e}^{t,c} + D_{n,i,e}^{t,w})}{\sum_{t=1}^{T}\sum_{n=1}^{N}\sum_{i=1}^{I} re_{n,i}^t}$$

s.t. $0 \leq x_m \leq 1, m \in (0, M)$ (C1)

$\sum_{i=1}^{I} y_{m,i}^R \cdot s \leq CR; \sum_{i=1}^{I} y_i^U \cdot s \leq CU$ (C2)

$0 \leq V^U \leq V_{max}^U$ (C3)

$y^R, y^U, re_{n,i}^t, \alpha_{n,i,e}^t \in (0, 1);$ (C4)

wherein $D_{ave}$ denotes the average request delay of the vehicle, $D_{n,i,e}^{t,c}$ and $D_{n,i,e}^{t,w}$ denotes a transmission time and a waiting time of the content, respectively; N denotes a total number of vehicles; I denotes a total number of contents; E denotes a set of content delivery modes; X denotes a set of proportions of local contents cached by all the roadside units; $Y^R$ and $Y^U$ denotes a set of content caching decisions of the roadside unit and the drone, respectively; and G denotes a trajectory of the drone;

(C1) indicates that a value of a caching ratio in the roadside unit ranges from 0 to 1; (C2) indicates that a size of a cached content is unable to exceed a maximum cache capacity, $y_{m,i}^R$ is a caching indicator variable of the roadside unit $R_m$ for the content $f_i$, s is a size of the content, $y_i^U$ is a caching decision indicator variable of the drone for the content $f_i$, and CR and CU denote a caching capacity of the roadside unit and a caching capacity of the drone, respectively; and (C3) is a constraint on a flight speed $V^U$ of the drone to not exceed a predetermined maximum speed $V_{max}^U$; and (C4) taking a value of 0 or 1 denotes a caching decision indicator variable $y_R$ of the roadside unit, a caching decision indicator variable $y^U$ of the drone, a request indicator variable $re_{n,i}^t$ of the content, and a delivery indicator variable of the content.

In some embodiments, the S5 includes:

S51, establishing an initial preference list of the roadside unit for each content in response to that a trajectory G of the drone in the time period T is known, optimizing the caching ratio of the roadside unit according to the initial preference list, when the optimization problem P is denoted as P1:

$$P1: \min_{x} D_{ave} = \frac{\sum_{t=1}^{T}\sum_{n=1}^{N}\sum_{i=1}^{I}\sum_{e=1}^{E} re_{n,i}^{t} \alpha_{n,i,e}^{t}(D_{n,i,e}^{t,c} + D_{n,i,e}^{t,w})}{\sum_{t=1}^{T}\sum_{n=1}^{N}\sum_{i=1}^{I} re_{n,i}^{t}}$$

s.t. $0 \le x_m \le 1, m \in (0, M);$ \hfill (C1)

S52, establishing to preference list of each cache node; for the roadside unit $R_m$, with all vehicles' locations, cached contents and requests known, calculating an average content request latency $D_0$ in the time period T in response to that all nodes except vehicles do not cache contents, and then calculating an average content request latency $D_{m,i}$ in the time period T in which only comment contents are cached in the roadside unit $R_m$ in response to that all roadside units and drones except the roadside unit $R_m$ and the vehicle do not cache any contents, and taking a value of $D_0 - D_{m,i}$ as a gain of the roadside unit $R_m$ caching the content $f_i$ without considering the interaction effect, and taking the gain as an initial preference weight of the roadside unit $R_m$ for the content $f_i$; similarly, calculating preference weights for all comment contents, and sorting all the comment contents in descending order according to the preference weights to obtain a preference list of the roadside unit for comment contents; wherein each roadside unit has a preference list of the local content and a preference list of the comment content, and the drone caches only comment contents and only has the preference list of the comment content;

S53, initializing the caching decision according to the preference list of the content, wherein a maximum number of cached content of the drone is $$CN_U = \frac{CR_U}{s},$$

then the drone caches first $CN_U$ local contents in its preference list of the comment content; a maximum number of cached content of the roadside unit is $$CN_R = \frac{CR_R}{s},$$

and the roadside unit decides the content caching decision based on the caching ratio according to an order of the local content and the preference list of the comment content, and a maximum number of the cached content of the roadside unit $R_m$ is $CN_m$, and a caching ratio of the local content of the roadside unit $R_m$ is $x_m$, then the roadside unit $R_m$ caches first $CN_m^l = x_m \cdot CN_m$ in contents in the preference list of the local content and first $CN_m^c = (1-x_m) \cdot CN_m$ contents in the preference list of the comment content, $$x_m = \frac{CN_m^l}{CN_m},$$

where $CN_m^l$ denotes a number of the local content cached in the roadside unit $R_m$, $CN_m^l \in (0, CN_m)$;

S54, iterating over all the caching ratios, each caching ratio corresponding to a caching scheme, calculating a corresponding average content request latency within the time period T, comparing all the latencies, and taking the caching ratio corresponding to a smallest latency as a final caching ratio of the local content of the roadside unit.

In some embodiments, in the S6, deciding the caching decision for each roadside unit and each drone by using the preference-based switched collaborative caching method includes:

S61, further optimizing the caching decision of the comment content of the drone and the roadside unit with known caching ratio of local content in the roadside unit and the flight trajectory of the drone, wherein the optimization problem P is simplified as:

$$P2: \min_{y^R, y^U} D_{ave} = \frac{\sum_{t=1}^{T}\sum_{n=1}^{N}\sum_{i=1}^{I}\sum_{e=1}^{E} re_{n,i}^{t} \alpha_{n,i,e}^{t}(D_{n,i,e}^{t,c} + D_{n,i,e}^{t,w})}{\sum_{t=1}^{T}\sum_{n=1}^{N}\sum_{i=1}^{I} re_{n,i}^{t}}$$

s.t. $\sum_{i=1}^{I} y_{m,i}^R s \le CR; \sum_{i=1}^{I} y_i^U s \le CU$ \hfill (C2)

$y^R, y^U \in (0, 1);$ \hfill (C4)

S62, designing a preference-based switched collaborative caching method; assuming that the roadside units and drones have been initially cached according to the initial preference list of the content and the optimized caching ratio, the caching decisions of all roadside units and drones are considered as a set $Y = \{Y_1, \ldots, Y_k, \ldots, Y_K\}$, wherein $K = M+1$; exchanging the preference list of the comment content of all roadside units and drones to be optimized, the roadside unit $R_m$ caching first $CN_m^c$ contents in its preference list of the comment content, at which the content request delay of the vehicle network in the time period T is $D_0^m$, there is a caching decision of exchanging from a $CN_m^c + 1$th content to a last content with first $CN_m^c$ contents in the preference list in turn; taking an exchanging process of a $CN_m^c + 1$th content as an example, first exchanging the $CN_m^c + 1$th content with the $CN_m^c$th content, calculating the average content request delay $D_{p,q}^m$ of the time period T under this caching decision; in response to that $D_{p,q}^m < D_0^m$, then keeping this caching decision, exchanging these two contents in the preference list, and ending an exchange of the $CN_m^c + 1$th content; in response to that $D_{p,q}^m \ge D_0^m$, then revoking an exchange of the caching decision of the two contents, continuing to use the initial caching decision, and continuing to forward exchange the $CN_m^c + 1$th content, which means exchanging the caching decision with a $CN_m^c + 1$th content, and repeating the above steps until obtaining the time delay less than $D_0^m$ or completing an exchange of all first $CN_m^c$ contents; after the completion of the exchange of the $CN_m^c + 1$th content, continuing an exchange of a $CN_m^c + 2$th content in a same way, and so on in a backward progression;

S63, the lower the ranking of the content in the preference list, the fewer the vehicles requesting the content near to the roadside unit $R_m$ during the time period T, so a probability of that an end of the preference list is able to exchange the caching decision with the first $CN_m^c$ contents is smaller, and in order to reduce a number of calculations, presetting a maximum number of failed exchanges, in response to that during the optimization of the roadside unit $R_m$, $rep_{max}$ contents continuously fail to exchange the caching decision with the first $CN_m^c$ contents, directly ending the optimization of the roadside unit $R_m$.

In some embodiments, in the S7, further optimizing the flight trajectory of the drone by using the greedy algorithm based trajectory optimization method includes:

S71, further optimizing the trajectory of the drone within the time period T with known caching decision, the optimization problem P being simplified as:

$$P3: \min_{G} D_{ave} = \frac{\sum_{t=1}^{T}\sum_{n=1}^{N}\sum_{i=1}^{I}\sum_{e=1}^{E} re_{n,i}^t \alpha_{n,i,e}^t (D_{n,i,e}^{t,c} + D_{n,i,e}^{t,w})}{\sum_{t=1}^{T}\sum_{n=1}^{N}\sum_{i=1}^{I} re_{n,i}^t}$$

s.t. $0 \leq V^U \leq V_{max}^U$;  (C3)

S72, because the request latency of the vehicle needs to wait for the content to be completely delivered before calculation is performed, and a number of successful content deliveries are able to reflect the magnitude of a total latency, and the more the number of successes the smaller the total latency, the number of successful content deliveries of the content in the in-vehicle network is used as a measure of the trajectory's superiority or inferiority; firstly, dividing the time period T into a plurality of small time periods, and each of the small time periods is used as a cycle of optimization of the trajectory; secondly, the trajectories are optimized for each cycle sequentially, based on a position of the drone and a length of the cycle, all destinations able to be reached in this cycle are listed and corresponding trajectories are generated, the number of successful content deliveries corresponding to these trajectories is calculated, and a trajectory with a highest number of successful deliveries is selected as a final trajectory for this cycle, and the destination reached is an initial position for a next trajectory optimization cycle, until all cycles are optimized.

A second aspect, the present application provides a device of a drone-assisted caching in an in-vehicle network based on geographic location, including a processor and a storage medium;

the storage medium for storing instructions;

the processor for operating in accordance with the instructions to perform the method of the first aspect.

A third aspect, the present application provides a storage medium having a computer program stored thereon, wherein the computer program, when executed by the processor, implements the method of the first aspect.

DETAILED DESCRIPTION OF THE EMBODIMENTS

The present application is further described below in conjunction with the accompanying drawings. The following embodiments are only used to illustrate the technical solution of the present application more clearly, and cannot be used to limit the scope of the present application.

In the description of the present application, reference terms "an embodiment", "some embodiments", "schematic embodiment", "example", "specific example", and "some examples" etc. mean that the specific features, structures, materials, or characteristics described in connection with the embodiment or example are included in at least one embodiment or example of the present application. In this specification, schematic expressions of the above terms do not necessarily refer to the same embodiment or example. Moreover, the specific features, structures, materials, or characteristics described may be combined in any one or more embodiments or examples in a suitable way.

The First Embodiment

A method of drone-assisted caching in an in-vehicle network based on geographic location, wherein a drone is introduced into the in-vehicle network, and caching decisions of a roadside unit, the drone, and a vehicle are jointly taken into account in consideration of the effect of a geographic location on a request of the vehicle, to reduce an average request latency, to increase a caching ratio, the method including: executing following steps according to a preset cycle:

S1, dividing content into local content and comment content;

S2, constructing a collaborative caching mechanism based on the local content and comment content;

S3, constructing a delivery decision for the vehicle to obtain the content in different situations;

S4, analyzing a latency required for the vehicle to obtain the content based on the delivery decision and the collaborative caching mechanism, constructing an optimization problem P for minimizing the average request latency of the vehicle in the in-vehicle network during a time period T;

S5, based on the optimization problem P, building a preference list of the content of the drone and the roadside unit without considering interaction effect, and performing an initial caching based on the preference list of the content, and determining a caching ratio of the roadside unit caching the local content and the comment content by using an exhaustive caching method;

S6, deciding a caching decision for each roadside unit and each drone by using a preference-based switched collaborative caching method based on the optimization problem P and the determined caching ratio of the roadside unit; and S7, optimizing a flight trajectory of the drone by using a greedy algorithm based trajectory optimization method based on the optimization problem P, the caching ratio of the roadside unit and the caching decisions of the roadside unit and the drone.

Figure 1:
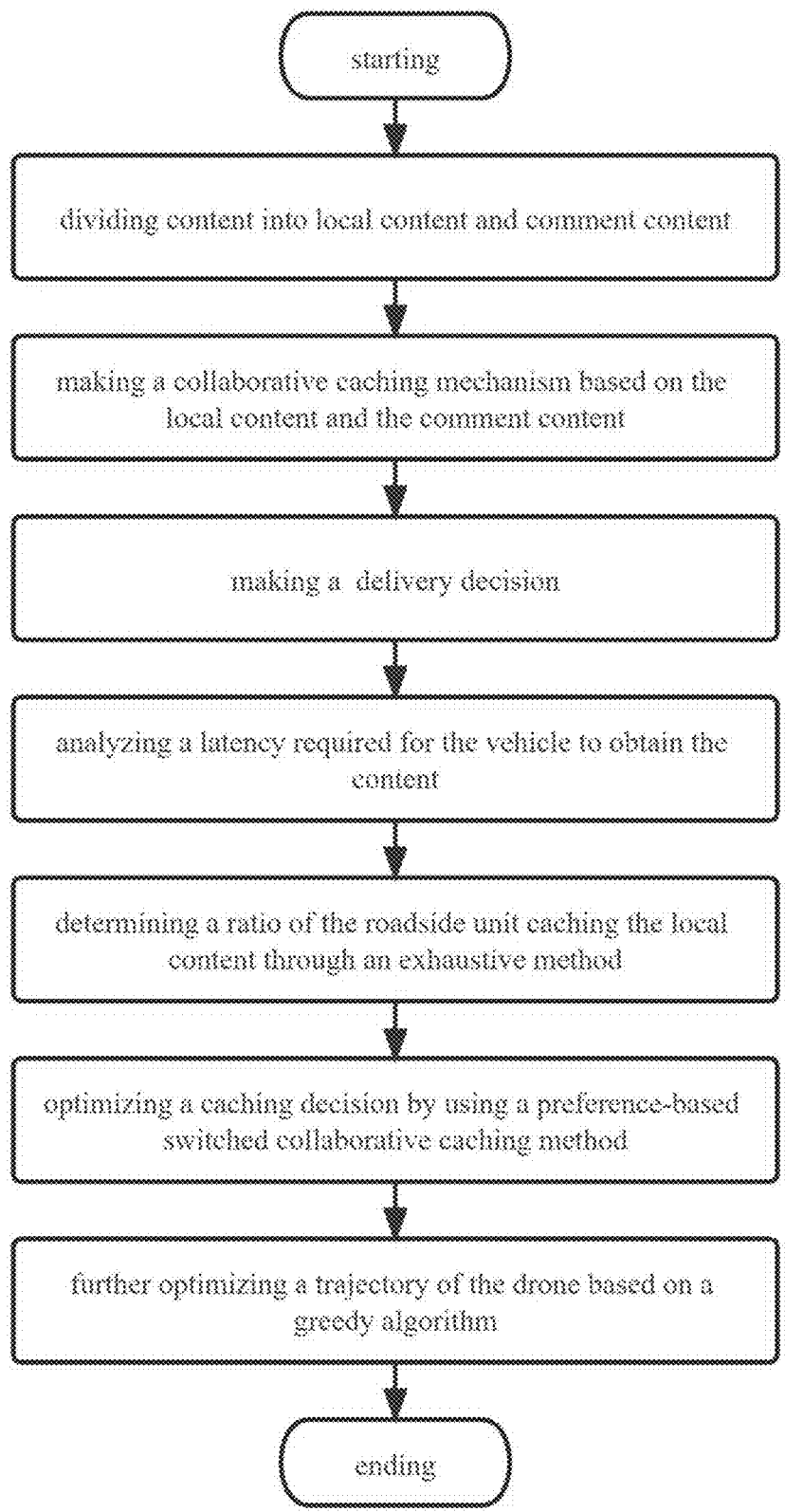
FIG. 1 is a flowchart of a process according to embodiments of the present application.
Figure 2:
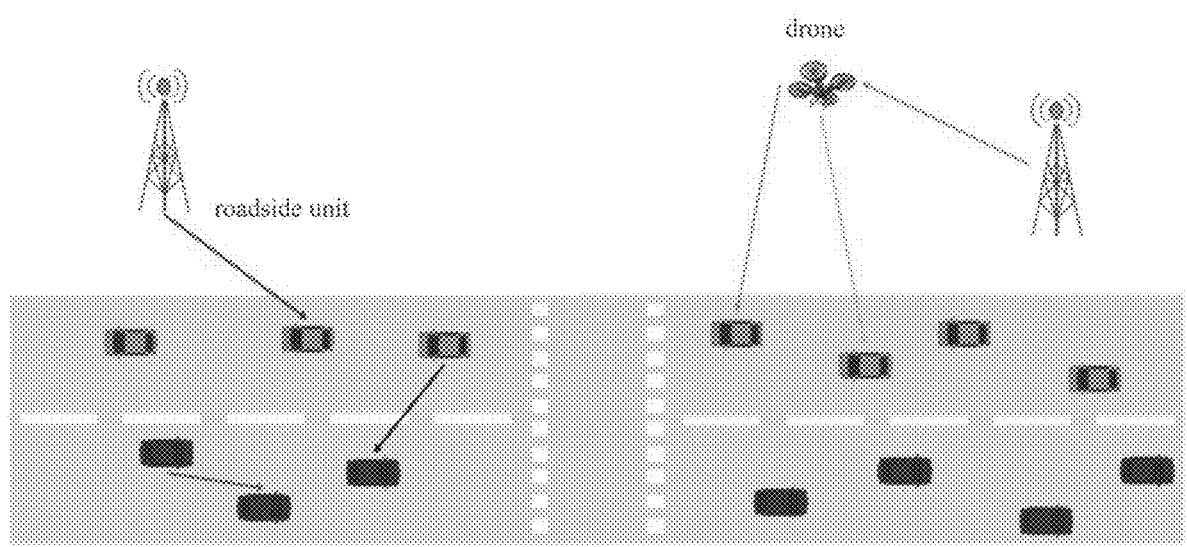
FIG. 2 is a schematic diagram of a system model according to embodiments of the present application.

Referring to FIGS. 1 and 2, an embodiment of the present application provides a method of drone-assisted caching in an in-vehicle network based on geographic location, a drone is introduced into the in-vehicle network, and caching decisions of a roadside unit, the drone, and a vehicle are jointly taken into account in consideration of the effect of a geographic location on a request of the vehicle, to reduce an average request latency, to increase a caching ratio, the communication radius of the roadside unit is 150 m, the communication radius of the drone is 100 m, and the communication radius of the vehicle is 50 m.

S1, dividing the content into local content and common content, where the local content refers to content related to the local geographic location, such as nearby road information and business information, etc., and the user requests the local content only when passing through the corresponding roadway; and the common content includes entertainment information, news, weather, etc., which is not related to the geographic location, and the user may request them at any location.

S2, constructing a collaborative caching mechanism based on the local content and comment content;

S3, constructing a delivery decision, the vehicle has different ways to obtain the content in different situations;

S4, analyzing a latency required for the vehicle to obtain the content based on the delivery decision and the collaborative caching mechanism;

S5, building a preference list of the content of the drone and the roadside unit without considering interaction effect, and performing an initial caching based on the preference list of the content, and determining a caching ratio of the roadside unit caching the local content and the comment content by using an exhaustive caching method;

S6, deciding a caching decision for each roadside unit and each drone by using a preference-based switched collaborative caching method; and S7, optimizing a flight trajectory of the drone by using a greedy algorithm based trajectory optimization method.

In the S2, the constructing the collaborative caching mechanism based on the local content and the common content includes:

S21, assuming that there are m numbers of road sections, deploying the roadside unit next to each road section, and deploying the drone with a caching function over the road section for assisting the roadside unit in providing services to the vehicle; dividing the time period T into a plurality of time slots, and the drone in each time slot has a corresponding traveling direction and speed.

Due to the small cache capacity and mobility of of the vehicles, only comment content is cached, and vehicles cache content according to the popularity probability; drones also have mobility, and their caching decisions will affect the flight trajectory of drones, and if local content is cached, the drone may stay on a certain road section for a long time, so only comment content is cached in the drone. The roadside unit is fixed and suitable to cache the local content of the road section where it locates, thus the roadside unit caches the local content and the comment content according to a certain ratio, and if a caching capacity of the roadside unit $R_m$ is $CR_m$, a capacity $x_m \cdot CR_m$ is used to cache the local content, and a remaining capacity $(1-x_m) \cdot CR_m$ is used to cache the comment content, $x_m$ denotes a ratio of the roadside unit $R_m$ caching the local content.

S22, $Y_m^R = \{y_{m,1}^R, \ldots y_{m,i}^R, \ldots, y_{m,I_m}^R\}$ is set of caching decision indicator variables of the roadside unit $R_m$, wherein $y_{m,i}^R$ is a caching indicator variable of the roadside unit $R_m$ for the content $f_i$, in response to that the roadside unit $R_m$ caches the content $f_i$, then $y_{m,i}^R=1$, otherwise $y_{m,i}^R=0$; and similarly $Y^U = \{y_1^U, \ldots y_b^U, \ldots, y_B^U\}$ is a set of caching decision indicator variables of the drone.

In the S3, making the delivery decision specifically includes:

S31, obtaining, by the vehicle, the content through five methods denoted as $\{1, \ldots, e, \ldots, E\}$, $E=5$, wherein a content delivery decision indicator variable is $\alpha_{n,i,e}^t$, $\alpha_{n,i,e'}^t=1$ indicates that the vehicle $v_n$ obtains the content $f_i$ through the method e in the time slot t, otherwise $\alpha_{n,i,e}^t=0$, each vehicle only obtains the content through one way denoted as $$\sum_{e=1}^{E} \alpha_{n,i,e}^t = 1;$$

S32, firstly searching for, by a requesting vehicle, requested content within one hop in a same direction lane, and if the requested content is searched, a vehicle where the requested content is from directly transmits the requested content to the requesting vehicle;

S33, if there is no the requested content for the vehicle within one hop in the same direction lane, querying information in a reverse lane; calculating time in which two vehicles are able to communicate based on speeds of the two vehicles and a distance between the two vehicles, and if the time for communication is greater than the time required for the content to be transmitted and the vehicle in the reverse lane caches the requested content, the requesting vehicle obtains the requested content from the vehicle in the reverse lane;

S34, if neither the vehicle in the same direction nor the vehicle in the reverse direction within the communication range have cached the requested content and the requesting vehicle is within a coverage area of the roadside unit, querying the information from the roadside unit, and if the roadside unit has cached the requested content, it will transmit directly to the requesting vehicle;

S35, if the requesting vehicle is not within the coverage area of the roadside unit or the roadside unit does not cache the requested content but the requesting vehicle is within a coverage area of the drone, querying information from the drone and if the requested content is found, the drone will transmit the requested content to the requesting vehicle;

S36, if the requested content is not found in the drone, but the drone is within the communication range of the roadside unit and the roadside unit has cached the requested content, the drone as a relay forwarding the requested content from the roadside unit to the requesting vehicle;

S37, if the content is not available by any of the above methods and waiting time $D^W$ does not exceed maximum waiting time $D_{max}^W$ allowed, the vehicle will continue to wait and the previous five steps is recycled in a next time slot until a feasible delivery method is found, if a suitable decision is not found within the maximum waiting time or a communication link is disconnected during transmission of the content, the request for the content is considered to be failed.

In the S4, the analyzing the latency required for the vehicle to obtain the content includes:

S41, in response to that the vehicle $v_n$ obtains the content $f_i$ through another vehicle $v_{n'}$ from moment $t_0$, then $\alpha_{n,i,1}^{t_0}=1$ or $\alpha_{n,i,2}^{t_0}=1$; a rate $R_{n',n}^{VV}(t)$ of the transmission of the content between the vehicle $v_n$ and the vehicle $v_{n'}$ in the time slot t, known from Shannon's formula, is denoted as:

$$R_{n',n}^{VV}(t) = B \log_2\left(1 + \frac{P_{n'} G_{n',n}(t)}{\sigma^2}\right);$$

where $P_{n'}$ is a transmit power of the vehicle $v_{n'}$ where the content is from, $\sigma^2$ is a Gaussian white noise variance at a receiver and $G_{n',n}(t)$ is a channel gain between the vehicle $v_n$ and the vehicle $v_{n'}$ in the time slot t, $G_{n',n}(t)=\chi \cdot d_{n',n}(t)^{-\delta}$, $\delta$ is a path loss index, $\chi$ is a channel fading gain, and $d_{n',n}(t)$ is a distance between the vehicle $v_n$ and the vehicle $v_{n'}$. Assuming that a length of each time slot is D, a current time slot $t_l$ is a lth time slot after the moment $t_0$, an amount of data denoted as $s_c(t_l)=D \cdot R_{n',n}^{VV}(t_l)$ is transmitted in the current time slot $t_l$; assuming that all the contents are of equal size donated s, a size of an amount of data that has not been transmitted in the current time slot $t_l$ is $$s_r(t_l) = s - \sum_{j=1}^{l-1} D \cdot R_{n',n}^{VV}(t_j),$$

if $s_r(t_l) > s_c(t_l)$, it means that the content delivery is unable to be completed in the current time slot and will be transmitted in a next time slot; if $s_r(t_l) \leq s_c(t_l)$, it represents that the content delivery is able to be completed in the current time slot, and time used for transmitting data in $$\frac{s_r(t_l)}{R_{n',n}^{VV}(t)},$$

the current time slot $t_l$ is a transmission of the content ends in the current time slot $t_l$; $t_{L+1}$ denotes a time slot in which the content delivery is completed, which means the vehicle fully obtains its requested content in L+1th time slot after the comment $t_0$, a transmission delay $D_{n,i,e}^{t_0}$ for the vehicle $v_n$ to obtain the content $f_i$ from the other vehicle $v_{n'}$ is denoted as:

$$D_{n,i,e}^{t_0} = \sum_{l=1}^{L} D + \frac{s - \sum_{j=1}^{L} D \cdot R_{n',n}^{VV}(t_j)}{R_{n',n}^{VV}(t_{L+1})}, e \in (1, 2);$$

S42, if the vehicle $v_n$ obtains the content $f_i$ directly through the roadside unit $R_m$ from the moment $t_0$; then $\alpha_{n,i,3}^{t_0}=1$, a rate at which the roadside unit $R_m$ transmits the content to the vehicle $v_n$ within the time slot t, shown from Shannon's formula, is denoted as:

$$R_{m,n}^{RV}(t) = B \log_2\left(1 + \frac{P_m G_{m,n}(t)}{\sigma^2}\right);$$

where $P_m$ is a transmit power of the roadside unit $R_m$, $G_{m,n}(t)$ is a channel gain between the roadside unit $R_m$ and the vehicle $v_n$ at the time slot t, $G_{m,n}(t)=\chi \cdot d_{m,n}(t)^{-\delta}$, $d_{m,n}(t)$ is a distance between the roadside unit $R_m$ and the vehicle $v_n$; the vehicle $v_n$ obtains the content in a similar way to S41, a transmission delay $D_{n,i,3}^{t_0}$ is denoted as:

$$D_{n,i,3}^{t_0} = \sum_{l=1}^{L} D + \frac{s - \sum_{j=1}^{L} D \cdot R_{m,n}^{RV}(t_j)}{R_{m,n}^{RV}(t_{L+1})};$$

S43, if the vehicle $v_n$ obtains the content $f_i$ through the drone from the moment $t_0$; then $\alpha_{n,i,4}^{t_0}=1$. For the communication between the drone and the vehicle, using probabilistic air-to-ground based communication model, which comprises a line-of-sight channel and a non-line-of-sight channel;

a transmission probability $P_{LoS}$ of the line-of-sight channel:

$$P_{LoS} = \frac{1}{1 + \beta_1 \exp[-\beta_2(\theta - \beta_1)]};$$

a transmission probability of the non-line-of-sight channel is $P_{NLoS}=1-P_{LoS}$, where $\theta$ represents an elevation angle from the drone to the vehicle, $\beta_1$ and $\beta_2$ are constant parameters subject to environment. A path loss between the drone and its associated vehicle for the transmission of the line-of-sight channel is $L_{Los}$, and a path loss between the drone and its associated vehicle for the transmission of the non-line-of-sight channel is $L_{NLos}$:

$$\begin{cases} L_{Los} = \eta_{LoS}\left(\frac{4\pi f_c}{c}\right)^2 d_{u,n}^{t2} \\ L_{NLos} = \eta_{NLoS}\left(\frac{4\pi f_c}{c}\right)^2 d_{u,n}^{t2} \end{cases};$$

where $\eta_{LoS}$ and $\eta_{NLoS}$ are attenuation factors corresponding to the line-of-sight channel and the non-line-of-sight channel, respectively, $f_c$ is a carrier frequency, c denotes a speed of light, and $d_{u,n}^t$ denotes a distance between the drone and the vehicle $v_n$. Thus, an an average path loss $\overline{L}$ of a channel from the drone to the vehicle can be obtained:

$$\overline{L} = P_{Los}L_{Los} + P_{NLos}L_{NLos};$$

a transmission rate $R_{u,n}^{UV}(t)$ of the content from the drone to the vehicle $v_n$ in the time slot t is:

$$R_{u,n}^{UV}(t) = B \log_2\left(1 + \frac{P_U}{\overline{L}(d_{u,n}^t)\sigma^2 B}\right);$$

where B denotes the bandwidth, $P_U$ denotes a transmission power of the drone, $\sigma^2$ is the Gaussian white noise variance at the receiver; and vehicle $v_n$ to obtains the content $f_i$ in a similar way to S41, the transmission delay is:

$$D_{n,i,4}^{t_0} = \sum_{l=1}^{L} D + \frac{s - \sum_{j=1}^{L} D \cdot R_{u,n}^{UV}(t_j)}{R_{u,n}^{UV}(t_{L+1})};$$

S44, if the vehicle $v_n$ obtains the content $f_i$ from the roadside unit $R_m$ relayed by the drone from the moment $t_0$, $\alpha_{n,i,5}^{t_0}=1$, then the transmission delay $D_{n,i,5}^{t_0}$ is equal to a delay of the roadside unit $R_m$ transmitting the content to the drone plus a delay $D_{n,i,5}^{t_0}$ of the drone forwarding the content to the vehicle $v_n$, which is denoted as:

$$D_{n,i,5}^{t_0} = \sum_{l=1}^{L} D + \frac{s - \left(D - \frac{s - \sum_{j'=1}^{L'} D \cdot R_{m,u}^{RU}(t_{j'})}{R_{m,u}^{RU}(t_{L'+1})}\right) \cdot R_{u,n}^{UV}(t_{l'+1}) - \sum_{j=l'+2}^{L} D \cdot R_{u,n}^{UV}(t_j)}{R_{u,n}^{UV}(t_{L+1})};$$

where L' denotes that the drone completely obtains the requested content in a L'+1th time slot after the comment $t_0$, and $R_{m,u}^{RU}$ denotes a communication rate between the roadside unit $R_m$ and the drone, the calculation of L' and $R_{m,u}^{RU}$ is in the same way to S41.

S45, combined with an above analysis of the time delay, the optimization problem of minimizing the average request latency of the vehicle in the in-vehicle network during the time period T can be denoted as:

$$P: \min_{X,Y^R,Y^U,G} D_{ave} = \frac{\sum_{t=1}^{T}\sum_{n=1}^{N}\sum_{i=1}^{I}\sum_{e=1}^{E} re_{n,i}^t \alpha_{n,i,e}^t (D_{n,i,e}^{t,c} + D_{n,i,e}^{t,w})}{\sum_{t=1}^{T}\sum_{n=1}^{N}\sum_{i=1}^{I} re_{n,i}^t}$$

s.t. $\quad 0 \le x_m \le 1, m \in (0, M)$ (C1)

$\sum_{i=1}^{I} y_{m,i}^R \cdot s \le CR; \sum_{i=1}^{I} y_i^U \cdot s \le CU$ (C2)

$0 \le V^U \le V_{max}^U$ (C3)

$y^R, y^U, re_{n,i}^t, \alpha_{n,i,e}^t \in (0, 1);$ (C4)

(C1) indicates that a value of a caching ratio in the roadside unit ranges from 0 to 1; (C2) indicates that a size of a cached content is unable to exceed a maximum cache capacity, and (C3) is a constraint on a flight speed of the drone; and (C4) taking a value of 0 or 1 denotes a caching decision indicator variable, a request indicator variable of the content, and a delivery indicator variable of the content.

In the S5, the drone and the roadside unit establish a preference list of the content, which specifically includes:

S51, establishing an initial preference list of the roadside unit for each content in response to that a trajectory G of the drone in the time period T is known, optimizing the caching ratio of the roadside unit according to the initial preference list, when the optimization problem P is denoted as P1:

$$P1: \min_x D_{ave} = \frac{\sum_{t=1}^{T}\sum_{n=1}^{N}\sum_{i=1}^{I}\sum_{e=1}^{E} re_{n,i}^t \alpha_{n,i,e}^t (D_{n,i,e}^{t,c} + D_{n,i,e}^{t,w})}{\sum_{t=1}^{T}\sum_{n=1}^{N}\sum_{i=1}^{I} re_{n,i}^t}$$

s.t. $0 \le x_m \le 1, m \in (0, M);$ (C1)

S52, establishing a preference list of each cache node; for the roadside unit $R_m$, with all vehicles' locations, cached contents and requests known, calculating an average content request latency $D_0$ in the time period T in response to that all nodes except vehicles do not cache contents, and then calculating an average content request latency $D_{m,i}$ in the time period T in which only comment contents are cached in the roadside unit $R_m$ in response to that all roadside units and drones except the roadside unit $R_m$ and the vehicle do not cache any contents, and taking a value of $D_0-D_{m,i}$ as a gain of the roadside unit $R_m$ caching the content $f_i$ without considering the interaction effect, and taking the gain as an initial preference weight of the roadside unit $R_m$ for the content $f_i$; similarly, calculating preference weights for all comment contents, and sorting all the comment contents in descending order according to the preference weights to obtain a preference list of the roadside unit for comment contents; wherein each roadside unit has a preference list of the local content and a preference list of the comment content, and the drone caches only comment contents and only has the preference list of the comment content;

S53, initializing the caching decision according to the preference list of the content, wherein a maximum number of cached content of the drone is $$CN_U = \frac{CR_U}{s},$$

then the drone caches first $CN_U$ local contents in its preference list of the comment content; a maximum number of cached content of the roadside unit is $$CN_R = \frac{CR_R}{s},$$

and the roadside unit decides the content caching decision based on the caching ratio according to an order of the local content and the preference list of the comment content, and a maximum number of the cached content of the roadside unit $R_m$ is $CN_m$, and a caching ratio of the local content of the roadside unit $R_m$ is $x_m$, then the roadside unit $R_m$ caches first $CN_m^l = x_m \cdot CN_m$ in contents in the preference list of the local content and first $CN_m^c = (1-x_m) \cdot CN_m$ contents in the preference list of the comment content, $$x_m = \frac{CN_m^l}{CN_m},$$

where $CN_m^l$ denotes a number of the local content cached in the roadside unit $R_m$, $CN_m^l \in (0, CN_m)$;

S54, iterating over all the caching ratios, each caching ratio corresponding to a caching scheme, calculating a corresponding average content request latency within the time period T, comparing all the latencies, and taking the caching ratio corresponding to a smallest latency as a final caching ratio of the local content of the roadside unit.

In the S6, the deciding the caching decision for each roadside unit and each drone by using the preference-based switched collaborative caching method includes:

S61, further optimizing the caching decision of the comment content of the drone and the roadside unit with known caching ratio of local content in the roadside unit and the flight trajectory of the drone, wherein the optimization problem P is simplified as:

$$P2: \min_{Y^R, Y^U} D_{ave} = \frac{\sum_{t=1}^{T}\sum_{n=1}^{N}\sum_{i=1}^{I}\sum_{e=1}^{E} re_{n,i}^t \alpha_{n,i,e}^t (D_{n,i,e}^{t,c} + D_{n,i,e}^{t,w})}{\sum_{t=1}^{T}\sum_{n=1}^{N}\sum_{i=1}^{I} re_{n,i}^t}$$

s.t. $\sum_{i=1}^{I} y_{m,i}^R s \le CR;\ \sum_{i=1}^{I} y_i^U s \le CU$ (C2)

$y^R, y^U \in (0, 1);$ (C4)

S62, designing a preference-based switched collaborative caching method; assuming that the roadside units and drones have been initially cached according to the initial preference list of the content and the optimized caching ratio, the caching decisions of all roadside units and drones are considered as a set $Y=\{Y_1, \ldots, Y_k, \ldots, Y_K\}$, wherein $K=M+1$; exchanging the preference list of the comment content of all roadside units and drones to be optimized, the roadside unit $R_m$ caching first $CN_m^c$ contents in its preference list of the comment content, at which the content request delay of the vehicle network in the time period T is $D_0^m$, there is a caching decision of exchanging from a $CN_m^c+1$th content to a last content with first $CN_m^c$ contents in the preference list in turn; taking an exchanging process of a $CN_m^c+1$th content as an example, first exchanging the $CN_m^c+1$th content with the $CN_m^c$th content, calculating the average content request delay $D_{p,q}^m$ of the time period T under this caching decision; in response to that $D_{p,q}^m < D_0^m$, then keeping this caching decision, exchanging these two contents in the preference list, and ending an exchange of the $CN_m^c+1$th content; in response to that $D_{p,q}^m \ge D_0^m$, then revoking an exchange of the caching decision of the two contents, continuing to use the initial caching decision, and continuing to forward exchange the $CN_m^c+1$th content, which means exchanging the caching decision with a $CN_m^c+1$th content, and repeating the above steps until obtaining the time delay less than $D_0^m$ or completing an exchange of all first $CN_m^c$ contents; after the completion of the exchange of the $CN_m^c+1$th content, continuing an exchange of a $CN_m^c+2$th content in a same way, and so on in a backward progression;

S63, the lower the ranking of the content in the preference list, the fewer the vehicles requesting the content near to the roadside unit $R_m$ during the time period T, so a probability of that an end of the preference list is able to exchange the caching decision with the first $CN_m^c$ contents is smaller, and in order to reduce a number of calculations, presetting a maximum number of failed exchanges, in response to that during the optimization of the roadside unit $R_m$, $rep_{max}$ contents continuously fail to exchange the caching decision with the first $CN_m^c$ contents, directly ending the optimization of the roadside unit $R_m$.

In the S7, the further optimizing the flight trajectory of the drone by using the greedy algorithm based trajectory optimization method includes:

S71, further optimizing the trajectory of the drone within the time period T with known caching decision, the optimization problem P being simplified as:

$$P3: \min_G D_{ave} = \frac{\sum_{t=1}^{T}\sum_{n=1}^{N}\sum_{i=1}^{I}\sum_{e=1}^{E} re_{n,i}^t \alpha_{n,i,e}^t (D_{n,i,e}^{t,c} + D_{n,i,e}^{t,w})}{\sum_{t=1}^{T}\sum_{n=1}^{N}\sum_{i=1}^{I} re_{n,i}^t}$$

s.t. $0 \le V^U \le V_{max}^U;$ (C3)

S72, because the request latency of the vehicle needs to wait for the content to be completely delivered before calculation is performed, and a number of successful content deliveries are able to reflect the magnitude of a total latency, and the more the number of successes the smaller the total latency, the number of successful content deliveries of the content in the in-vehicle network is used as a measure of the trajectory's superiority or inferiority; firstly, dividing the time period T into a plurality of small time periods, and each of the small time periods is used as a cycle of optimization of the trajectory; secondly, the trajectories are optimized for each cycle sequentially, based on a position of the drone and a length of the cycle, all destinations able to be reached in this cycle are listed and corresponding trajectories are generated, the number of successful content deliveries corresponding to these trajectories is calculated, and a trajectory with a highest number of successful deliveries is selected as a final trajectory for this cycle, and the destination reached is an initial position for a next trajectory optimization cycle, until all cycles are optimized.

The Second Embodiment

In the second embodiment, the present application provides a device of drone-assisted caching in an in-vehicle network based on geographic location, which includes a processor and a storage medium; the storage medium is configured for storing instructions; the processor is configured for operating according to the instructions to perform the method according to the first embodiment.

The Third Embodiment

In the third aspect, the present application provides a storage medium, on which a computer program is stored, wherein the computer program, when executed by the processor, implements the method according to the first embodiment.

It should be appreciated by those skilled in the art that embodiments of the present application may be provided as methods, systems, or computer program products. Thus, the present application may take the form of a fully hardware embodiment, a fully software embodiment, or an embodiment that combines software and hardware aspects. Moreover, the present application may take the form of a computer program product implemented on one or more computer-usable storage media (including, but not limited to, disk memory, CD-ROM, optical memory, and the like) that contain computer-usable program code therein.

The present application is described with reference to flowcharts and/or block diagrams of methods, devices (systems), and computer program products according to embodiments of the present application. It should be understood that each of the processes and/or boxes in the flowchart and/or the block diagram, and the combination of processes and/or boxes in the flowchart and/or the block diagram, may be implemented by computer program instructions. These computer program instructions may be provided to a processor of a general-purpose computer, a special-purpose computer, an embedded processor, or other programmable data-processing device to produce a machine, such that the instructions executed by the processor of the computer or other programmable data-processing device produce a device for carrying out the functions specified in the one process or multiple processes of the flowchart and/or the one box or multiple boxes of the box diagram.

These computer program instructions may also be stored in computer-readable memory capable of directing the computer or other programmable data processing device to operate in a particular manner, such that the instructions stored in the computer-readable memory produce an article of manufacture comprising an instruction device that implements the function specified in the flowchart one process or a plurality of processes and/or the box diagram one box or a plurality of boxes.

These computer program instructions may also be loaded onto a computer or other programmable data processing device, such that a series of operational steps are performed on the computer or other programmable device to produce computer-implemented processing, such that the instructions executed on the computer or other programmable device provide steps for implementing the functionality specified in one process or a plurality of processes and/or the box diagram one box or a plurality of boxes in the flowchart.

The embodiments of the present application are described in detail above in conjunction with the accompanying drawings, but the present application is not limited to the above embodiments, and various changes can be made within the scope of knowledge possessed by those skilled in the art without departing from the purpose of the present application.

What is claimed is:

1. A method of drone-assisted caching in an in-vehicle network based on geographic location, wherein a drone is introduced into the in-vehicle network, and caching decisions of a roadside unit, the drone, and a vehicle are jointly taken into account in consideration of the effect of a geographic location on a request of the vehicle, to reduce an average request latency, to increase a caching ratio, the method comprising: executing following steps according to a preset cycle:

S1, dividing content into local content and comment content;

S2, constructing a collaborative caching mechanism based on the local content and comment content;

S3, constructing a delivery decision for the vehicle to obtain the content in different situations;

S4, analyzing a latency required for the vehicle to obtain the content based on the delivery decision and the collaborative caching mechanism, constructing an optimization problem P for minimizing the average request latency of the vehicle in the in-vehicle network during a time period T;

S5, based on the optimization problem P, building a preference list of the content of the drone and the roadside unit without considering interaction effect, and performing an initial caching based on the preference list of the content, and determining a caching ratio of the roadside unit caching the local content and the comment content by using an exhaustive caching method;

S6, deciding a caching decision for each roadside unit and each drone by using a preference-based switched collaborative caching method based on the optimization problem P and the determined caching ratio of the roadside unit; and S7, further optimizing a flight trajectory of the drone by using a greedy algorithm based trajectory optimization method based on the optimization problem P, the caching ratio of the roadside unit and the caching decisions of the roadside unit and the drone.

2. The method of the drone-assisted caching in the in-vehicle network based on geographic location according to claim 1, wherein in the S2, theeen-stfuet-iiig the constructing the collaborative caching mechanism based on the local content and the common content comprises:

S2(1), assuming that there are M numbers of road sections, deploying the roadside unit next to each road section, and deploying the drone with a caching function over the road section for assisting the roadside unit in providing services to the vehicle; dividing the time period T into a plurality of time slots, and the drone in each time slot has a corresponding traveling direction and speed;

a moving vehicle and the drone cache only the comment content, and the roadside unit fixed caches the local content and the comment content according to a certain ratio, and in response to that a caching capacity of the roadside unit $R_m$ is $CR_m$, a capacity $x_m \cdot CR_m$ is used to cache the local content, and a remaining capacity $(1-x_m) \cdot CR_m$ is used to cache the comment content, wherein $x_m$ denotes a ratio of the roadside unit $R_m$ caching the local content; and S2(2), $Y_m^R = \{y_{m,1}^R, \ldots y_{m,i}^R, \ldots, y_{m,I_m}^R\}$ is a set of caching decision indicator variables of the roadside unit $R_m$, wherein $y_{m,i}^R$ is a caching indicator variable of the roadside unit $R_m$ for the content $f_i$, in response to that the roadside unit $R_m$ caches the content $f_i$, then $y_{m,i}^R = 1$, otherwise $y_{m,i}^R = 0$; and similarly $Y^U = \{y_1^U, \ldots y_b^U, \ldots, y_B^U\}$ is a set of caching decision indicator variables of the drone.

3. The method of the drone-assisted caching in the in-vehicle network based on geographic location according to claim 1, wherein in the S3, the constructing the delivery decision for the vehicle to obtain the content in different situations comprises:

S3(1), obtaining, by the vehicle, the content through five methods denoted as $\{1, \ldots, e, \ldots, E\}$, E=5, wherein a content delivery decision indicator variable is $\alpha_{n,i,e}^t$, $\alpha_{n,i,e}^t = 1$ indicates that the vehicle $v_n$ obtains the content $f_i$ through the method e in the time slot t, otherwise $\alpha_{n,i,e}^t = 0$, each vehicle only obtains the content through one way denoted as $$\sum_{e=1}^{E} \alpha_{n,i,e}^t = 1;$$

S3(2), firstly searching for, by a requesting vehicle, requested content within one hop in a same direction lane, and in response to that the requested content is searched, a vehicle where the requested content is from directly transmits the requested content to the requesting vehicle;

S3(3), in response to that there is no the requested content for the vehicle within one hop in the same direction lane, querying information in a reverse lane; calculating time in which two vehicles are able to communicate based on speeds of the two vehicles and a distance between the two vehicles, and in response to that the time for communication is greater than the time required for the content to be transmitted and the vehicle in the reverse lane caches the requested content, the requesting vehicle obtains the requested content from the vehicle in the reverse lane;

S3(4), in response to that neither the vehicle in the same direction nor the vehicle in the reverse direction within the communication range have cached the requested content and the requesting vehicle is within a coverage area of the roadside unit, querying the information from the roadside unit, and in response to that the roadside unit has cached the requested content, it will transmit directly to the requesting vehicle;

S3(5), in response to that the requesting vehicle is not within the coverage area of the roadside unit or the roadside unit does not cache the requested content but the requesting vehicle is within a coverage area of the drone, querying information from the drone and in response to that the requested content is found, the drone will transmit the requested content to the requesting vehicle;

S3(6), in response to that the requested content is not found in the drone, but the drone is within the communication range of the roadside unit and the roadside unit has cached the requested content, the drone as a relay forwarding the requested content from the roadside unit to the requesting vehicle;

S3(7), in response to that the content is not available by any of the above methods and waiting time $D^W$ does not exceed maximum waiting time $D_{max}^W$ allowed, the vehicle will continue to wait and S32 to S36 is recycled in a next time slot until a feasible delivery method is found, in response to that a suitable decision is not found within the maximum waiting time or a communication link is disconnected during transmission of the content, the request for the content is considered to be failed.

4. The method of the drone-assisted caching in the in-vehicle network based on geographic location according to claim 1, wherein in the S4, the analyzing the latency required for the vehicle to obtain the content comprises:

S4(1), in response to that the vehicle $v_n$ obtains the content $f_i$ through another vehicle $v_{n'}$ from moment $t_0$, then $\alpha_{n,i,1}^{t_0}=1$ or $\alpha_{n,i,2}^{t_0}=1$; a rate $R_{n',n}^{VV}(t)$ of the transmission of the content between the vehicle $v_n$ and the vehicle $v_{n'}$ in the time slot t, known from Shannon's formula, is denoted as:

$$R_{n',n}^{VV}(t) = B\log_2\left(1 + \frac{P_{n'} G_{n',n}(t)}{\sigma^2}\right);$$

where B denotes a bandwidth, $P_{n'}$ is a transmit power of the vehicle $v_{n'}$ where the content is from, $\sigma^2$ is a Gaussian white noise variance at a receiver and $G_{n',n}(t)$ is a channel gain between the vehicle $v_n$ and the vehicle $v_{n'}$ in the time slot t, $G_{n',n}(t)=\chi \cdot d_{n',n}(t)^{-\delta}$, $\delta$ is a path loss index, $\chi$ is a channel fading gain, and $d_{n',n}(t)$ is a distance between the vehicle $v_n$ and the vehicle $v_{n'}$;

assuming that a length of each time slot is D, a current time slot $t_l$ is a lth time slot after the moment $t_0$, an amount of data denoted as $s_c(t_l)=D \cdot R_{n',n}^{VV}(t_l)$ is transmitted in the current time slot $t_l$; assuming that all the contents are of equal size donated s, a size of an amount of data that has not been transmitted in the current time slot $t_l$ is $$s_r(t_l) = s - \sum_{j=1}^{l-1} D \cdot R_{n',n}^{VV}(t_j),$$

in response to that $s_r(t_l) > s_c(t_l)$, it means that the content delivery is unable to be completed in the current time slot and will be transmitted in a next time slot; in response to that $s_r(t_l) \leq s_c(t_l)$, it represents that the content delivery is able to be completed in the current time slot, and time used for transmitting data in the current time slot $t_l$ is $$\frac{s_r(t_l)}{R_{n',n}^{VV}(t)};$$

a transmission of the content ends in the current time slot $t_l$; $t_{L+1}$ denotes a time slot in which the content delivery is completed, which means the vehicle fully obtains its requested content in L+1th time slot after the comment $t_0$, a transmission delay $D_{n,i,e}^{t_0}$ for the vehicle $v_n$ to obtain the content $f_i$ from the other vehicle $v_{n'}$ is denoted as:

$$D_{n,i,e}^{t_0} = \sum_{l=1}^{L} D + \frac{s - \sum_{j=1}^{L} D \cdot R_{n',n}^{VV}(t_j)}{R_{n',n}^{VV}(t_{L+1})}, e \in (1, 2);$$

S4(2), in response to that the vehicle $v_n$ obtains the content $f_i$ directly through the roadside unit $R_m$ from the moment $t_0$; then $\alpha_{n,i,3}^{t_0}=1$, a rate at which the roadside unit $R_m$ transmits the content to the vehicle $v_n$ within the time slot t, shown from Shannon's formula, is denoted as:

$$R_{m,n}^{RV}(t) = B\log_2\left(1 + \frac{P_m G_{m,n}(t)}{\sigma^2}\right);$$

where B denotes the bandwidth, $P_m$ is a transmit power of the roadside unit $R_m$, $G_{m,n}(t)$ is a channel gain between the roadside unit $R_m$ and the vehicle $v_n$ at the time slot t, $G_{m,n}(t)=\chi \cdot d_{m,n}(t)^{-\delta}$, $d_{m,n}(t)$ is a distance between the roadside unit $R_m$ and the vehicle $v_n$; $t_{L+1}$ denotes a time slot for completing the content delivery, which means the vehicle fully obtains its requested content within the L+1 time slot after $t_0$, a transmission delay $D_{n,i,3}^{t_0}$ of the vehicle $v_n$ obtaining the content $f_i$ from the roadside unit $R_m$ is denoted as:

$$D_{n,i,3}^{t_0} = \sum_{l=1}^{L} D + \frac{s - \sum_{j=1}^{L} D \cdot R_{m,n}^{RV}(t_j)}{R_{m,n}^{RV}(t_{L+1})};$$

S4(3), in response to that the vehicle $v_n$ obtains the content $f_i$ through the drone from the moment $t_0$; then $\alpha_{n,i,4}^{t_0}=1$, for the communication between the drone and the vehicle, using probabilistic air-to-ground based communication model, which comprises a line-of-sight channel and a non-line-of-sight channel;

a transmission probability $P_{LoS}$ of the line-of-sight channel:

$$P_{LoS} = \frac{1}{1+\beta_1\exp[-\beta_2(\theta-\beta_1)]};$$

a transmission probability of the non-line-of-sight channel is $P_{NLoS}=1-P_{LoS}$, where $\theta$ represents an elevation angle from the drone to the vehicle, $\beta_1$ and $\beta_2$ are constant parameters subject to environment;

a path loss between the drone and its associated vehicle for the transmission of the line-of-sight channel is $L_{Los}$, and a path loss between the drone and its associated vehicle for the transmission of the non-line-of-sight channel is $L_{NLos}$:

$$\begin{cases} L_{Los} = \eta_{LoS}\left(\dfrac{4\pi f_c}{c}\right)^2 d_{u,n}^{t\,2} \\ L_{NLos} = \eta_{NLoS}\left(\dfrac{4\pi f_c}{c}\right)^2 d_{u,n}^{t\,2} \end{cases};$$

where $\eta_{LoS}$ and $\eta_{NLoS}$ are attenuation factors corresponding to the line-of-sight channel and the non-line-of-sight channel, respectively, $f_c$ is a carrier frequency, c denotes a speed of light, and $d_{u,n}^t$ denotes a distance between the drone and the vehicle $v_n$;

an average path loss $\overline{L}$ of a channel from the drone to the vehicle is:

$$\overline{L}=P_{Los}L_{Los}+P_{NLos}L_{NLos};$$

a transmission rate $R_{u,n}^{UV}(t)$ of the content from the drone to the vehicle $v_n$ in the time slot t is:

$$R_{u,n}^{UV}(t) = B\log_2\left(1+\frac{P_U}{\overline{L}(d_{u,n}^t)\sigma^2 B}\right);$$

where B denotes the bandwidth, $P_U$ denotes a transmission power of the drone, $d_{u,n}^t$ denotes a distance between the drone and the vehicle $v_n$; $\sigma^2$ is the Gaussian white noise variance at the receiver; and a transmission delay of the vehicle $v_n$ to obtains the content $f_i$ from the drone is $D_{n,i,4}^{t_0}$:

$$D_{n,i,4}^{t_0} = \sum_{l=1}^{L} D + \frac{s-\sum_{j=1}^{L} D\cdot R_{u,n}^{UV}(t_j)}{R_{u,n}^{UV}(t_{L+1})};$$

S4(4), in response to that the vehicle $v_n$ obtains the content $f_i$ from the roadside unit $R_m$ relayed by the drone from the moment $t_0$, $\alpha_{n,i,5}^{t_0}=1$, then the transmission delay $D_{n,i,5}^{t_0}$ is equal to a delay of the roadside unit $R_m$ transmitting the content to the drone plus a delay $D_{n,i,5}^{t_0}$ of the drone forwarding the content to the vehicle $v_n$, which is denoted as:

$$D_{n,i,5}^{t_0} = \sum_{l=1}^{L} D + \frac{s-\left(D-\dfrac{s-\sum_{j'=1}^{L} D\cdot R_{m,u}^{RU}(t_{j'})}{R_{m,u}^{RU}(t_{L'+1})}\right)\cdot R_{u,n}^{UV}(t_{l'+1}) - \sum_{j=l'+2}^{L} D\cdot R_{u,n}^{UV}(t_j)}{R_{u,n}^{UV}(t_{L+1})};$$

where L' denotes that the drone completely obtains the requested content in a L'+1th time slot after the comment $t_0$, and $R_{m,u}^{RU}$ denotes a communication rate between the roadside unit $R_m$ and the drone.

5. The method of the drone-assisted caching in the in-vehicle network based on geographic location according to claim 1, wherein in the S4, the optimization problem P of minimizing the average request latency of the vehicle in the in-vehicle network during the time period T is denoted as:

$$P: \min_{X,Y^R,Y^U,G} D_{ave} = \frac{\sum_{t=1}^{T}\sum_{n=1}^{N}\sum_{i=1}^{I}\sum_{e=1}^{E} re_{n,i}^t \alpha_{n,i,e}^t (D_{n,i,e}^{t,c}+D_{n,i,e}^{t,w})}{\sum_{t=1}^{T}\sum_{n=1}^{N}\sum_{i=1}^{I} re_{n,i}^t}$$

s.t. $(C1) 0 \le x_m \le 1, m \in (0, M)$ $(C2) \sum_{i=1}^{I} y_{m,i}^R \cdot s \le CR; \sum_{i=1}^{I} y_i^U \cdot s \le CU$;

$(C3) 0 \le V^U \le V_{max}^U$ $(C4) y^R, y^U, re_{n,i}^t, \alpha_{n,i,e}^t \in (0, 1)$ wherein $D_{ave}$ denotes the average request delay of the vehicle, $D_{n,i,e}^{t,c}$ and $D_{n,i,e}^{t,w}$ denotes a transmission time and a waiting time of the content, respectively; N denotes a total number of vehicles; I denotes a total number of contents; E denotes a set of content delivery modes; X denotes a set of proportions of local contents cached by all the roadside units; $Y^R$ and $Y_U$ denotes a set of content caching decisions of the roadside unit and the drone, respectively; and G denotes a trajectory of the drone;

(C1) indicates that a value of a caching ratio in the roadside unit ranges from 0 to 1; (C2) indicates that a size of a cached content is unable to exceed a maximum cache capacity, $y_{m,i}^R$ is a caching indicator variable of the roadside unit $R_m$ for the content $f_i$, s is a size of the content, $y_i^U$ is a caching decision indicator variable of the drone for the content $f_i$, and CR and CU denote a caching capacity of the roadside unit and a caching capacity of the drone, respectively; and (C3) is a constraint on a flight speed $V^U$ of the drone to not exceed a predetermined maximum speed $V_{max}^U$; and (C4) taking a value of 0 or 1 denotes a caching decision indicator variable $y^R$ of the roadside unit, a caching decision indicator variable $y^U$ of the drone, a request indicator variable $re_{n,i}^t$ of the content, and a delivery indicator variable of the content.

6. The method of the drone-assisted caching in the in-vehicle network based on geographic location according to claim 5, wherein the S5 comprises:

S5(1), establishing an initial preference list of the roadside unit for each content in response to that a trajectory G of the drone in the time period T is known, optimizing the caching ratio of the roadside unit according to the initial preference list, when the optimization problem P is denoted as P1:

$$P1: \min_x D_{ave} = \frac{\sum_{t=1}^{T}\sum_{n=1}^{N}\sum_{i=1}^{I}\sum_{e=1}^{E} re_{n,i}^t \alpha_{n,i,e}^t (D_{n,i,e}^{t,c} + D_{n,i,e}^{t,w})}{\sum_{t=1}^{T}\sum_{n=1}^{N}\sum_{i=1}^{I} re_{n,i}^t};$$

s.t. $(C1) 0 \le x_m \le 1, m \in (0, M)$

S5(2), establishing to preference list of each cache node; for the roadside unit $R_m$, with all vehicles' locations, cached contents and requests known, calculating an average content request latency $D_0$ in the time period T in response to that all nodes except vehicles do not cache contents, and then calculating an average content request latency $D_{m,i}$ in the time period T in which only comment contents are cached in the roadside unit $R_m$ in response to that all roadside units and drones except the roadside unit $R_m$ and the vehicle do not cache any contents, and taking a value of $D_0-D_{m,i}$ as a gain of the roadside unit $R_m$ caching the content $f_i$ without considering the interaction effect, and taking the gain as an initial preference weight of the roadside unit $R_m$ for the content $f_i$; similarly, calculating preference weights for all comment contents, and sorting all the comment contents in descending order according to the preference weights to obtain a preference list of the roadside unit for comment contents; wherein each roadside unit has a preference list of the local content and a preference list of the comment content, and the drone caches only comment contents and only has the preference list of the comment content;

S5(3), initializing the caching decision according to the preference list of the content, wherein a maximum number of cached content of the drone is $$CN_U = \frac{CR_U}{s},$$

then the drone caches first $CN_U$ local contents in its preference list of the comment content; a maximum number of cached content of the roadside unit is $$CN_R = \frac{CR_R}{s},$$

and the roadside unit decides the content caching decision based on the caching ratio according to an order of the local content and the preference list of the comment content, and a maximum number of the cached content of the roadside unit $R_m$ is $CN_m$, and a caching ratio of the local content of the roadside unit $R_m$ is $x_m$, then the roadside unit $R_m$ caches first $CN_m^l = x_m \cdot CN_m$ contents in the preference list of the local content and first $CN_m^c = (1-x_m) \cdot CN_m$ contents in the preference list of the comment content, $$x_m = \frac{CN_m^l}{CN_m},$$

where $CN_m^l$ denotes a number of the local content cached in the roadside unit $R_m$, $CN_m^l \in (0, CN_m)$;

S5(4), iterating over all the caching ratios, each caching ratio corresponding to a caching scheme, calculating a corresponding average content request latency within the time period T, comparing all the latencies, and taking the caching ratio corresponding to a smallest latency as a final caching ratio of the local content of the roadside unit.

7. The method of the drone-assisted caching in the in-vehicle network based on geographic location according to claim 5, wherein in the S6, the deciding the caching decision for each roadside unit and each drone by using the preference-based switched collaborative caching method comprises:

S6(1), further optimizing the caching decision of the comment content of the drone and the roadside unit with known caching ratio of local content in the roadside unit and the flight trajectory of the drone, wherein the optimization problem P is simplified as:

$$P2: \min_{y^R, y^U} D_{ave} = \frac{\sum_{t=1}^{T}\sum_{n=1}^{N}\sum_{i=1}^{I}\sum_{e=1}^{E} re_{n,i}^t \alpha_{n,i,e}^t (D_{n,i,e}^{t,c} + D_{n,i,e}^{t,w})}{\sum_{t=1}^{T}\sum_{n=1}^{N}\sum_{i=1}^{I} re_{n,i}^t}$$

s.t. $(C2) \sum_{i=1}^{I} y_{m,i}^R s \le CR; \sum_{i=1}^{I} y_i^U s \le CU$;

$(C4) y^R, y^U \in (0, 1)$

S6(2), designing a preference-based switched collaborative caching method; assuming that the roadside units and drones have been initially cached according to the initial preference list of the content and the optimized caching ratio, the caching decisions of all roadside units and drones are considered as a set $Y=\{Y_1, \ldots, Y_k, \ldots, Y_K\}$, wherein $K=M+1$; exchanging the preference list of the comment content of all roadside units and drones to be optimized, the roadside unit $R_m$ caching first $CN_m^c$ contents in its preference list of the comment content, at which the content request delay of the vehicle network in the time period T is $D_0^m$, there is a caching decision of exchanging from a $CN_m^c+1$th content to a last content with first $CN_m^c$ contents in the preference list in turn; taking an exchanging process of a $CN_m^c+1$th content as an example, first exchanging the $CN_m^c+1$th content with the $CN_m^c$th content, calculating the average content request delay $D_{p,q}^m$ of the time period T under this caching decision; in response to that $D_{p,q}^m < D_0^m$, then keeping this caching decision, exchanging these two contents in the preference list, and ending an exchange of the $CN_m^c+1$th content; in response to that $D_{p,q}^m \ge D_0^m$, then revoking an exchange of the caching decision of the two contents, continuing to use the initial caching decision, and continuing to forward exchange the $CN_m^c+1$th content, which means exchanging the caching decision with a $CN_m^c+1$th content, and repeating the above steps until obtaining the time delay less than $D_0^m$ or completing an exchange of all first $CN_m^c$ contents; after the completion of the exchange of the $CN_m^c+1$th content, continuing an exchange of a $CN_m^c+2$th content in a same way, and so on in a backward progression;

S6(3), the lower the ranking of the content in the preference list, the fewer the vehicles requesting the content near to the roadside unit $R_m$ during the time period T, so a probability of that an end of the preference list is able to exchange the caching decision with the first $CN_m^c$ contents is smaller, and in order to reduce a number of calculations, presetting a maximum number of failed exchanges, in response to that during the optimization of the roadside unit $R_m$, $rep_{max}$ contents continuously fail to exchange the caching decision with the first $CN_m^c$ contents, directly ending the optimization of the roadside unit $R_m$.

8. The method of the drone-assisted caching in the in-vehicle network based on geographic location according to claim 5, wherein in the S7, the further optimizing the flight trajectory of the drone by using the greedy algorithm based trajectory optimization method comprises:

S7(1), further optimizing the trajectory of the drone within the time period T with known caching decision, the optimization problem P being simplified as:

$$P3: \min_G D_{ave} = \frac{\sum_{t=1}^{T}\sum_{n=1}^{N}\sum_{i=1}^{I}\sum_{e=1}^{E} re_{n,i}^t \alpha_{n,i,e}^t (D_{n,i,e}^{t,c} + D_{n,i,e}^{t,w})}{\sum_{t=1}^{T}\sum_{n=1}^{N}\sum_{i=1}^{I} re_{n,i}^t};$$

s.t. $(C3) 0 \le V^U \le V_{max}^U$

S7(2), because the request latency of the vehicle needs to wait for the content to be completely delivered before calculation is performed, and a number of successful content deliveries are able to reflect the magnitude of a total latency, and the more the number of successes the smaller the total latency, the number of successful content deliveries of the content in the in-vehicle network is used as a measure of the trajectory's superiority or inferiority; firstly, dividing the time period T into a plurality of small time periods, and each of the small time periods is used as a cycle of optimization of the trajectory; secondly, the trajectories are optimized for each cycle sequentially, based on a position of the drone and a length of the cycle, all destinations able to be reached in this cycle are listed and corresponding trajectories are generated, the number of successful content deliveries corresponding to these trajectories is calculated, and a trajectory with a highest number of successful deliveries is selected as a final trajectory for this cycle, and the destination reached is an initial position for a next trajectory optimization cycle, until all cycles are optimized.

9. A device of drone-assisted caching in an in-vehicle network based on geographic location, comprising a processor and a storage medium;

the storage medium for storing instructions;

the processor for operating according to the instructions to perform the method according to claim 1.

10. A non-transitory storage medium, on which a computer program is stored, wherein the computer program, when executed by the processor, implements the method according to claim 1.

* * * * *